US007376376B2

(12) United States Patent
Ebara et al.

(10) Patent No.: US 7,376,376 B2
(45) Date of Patent: May 20, 2008

(54) METHOD AND APPARATUS FOR IMAGE FORMING CAPABLE OF EFFECTIVELY ADJUSTING IMAGE SHIFTS

(75) Inventors: Joh Ebara, Kanagawa (JP); Toshiyuki Uchida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 11/374,970

(22) Filed: Mar. 15, 2006

(65) Prior Publication Data

US 2006/0222418 A1 Oct. 5, 2006

(30) Foreign Application Priority Data

Mar. 15, 2005 (JP) ............................ 2005-072313

(51) Int. Cl.
*G03G 15/01* (2006.01)
*B41J 2/385* (2006.01)
*G01D 15/16* (2006.01)

(52) U.S. Cl. ...................................... 399/301; 347/116

(58) Field of Classification Search ................ 399/299, 399/301, 302; 347/115, 116
See application file for complete search history.

(56) References Cited

U.S. PATENT DOCUMENTS 6,154,628 A * 11/2000 Kawano .................... 399/301
6,408,157 B1 * 6/2002 Tanaka et al. ............. 399/301
2005/0058470 A1 3/2005 Funamoto et al.
2005/0084293 A1 4/2005 Fukuchi et al.
2005/0207799 A1 9/2005 Ebara

FOREIGN PATENT DOCUMENTS

JP 2000-298385 10/2000
JP 2004-198630 7/2004

* cited by examiner

*Primary Examiner*—Sandra L. Brase
(74) *Attorney, Agent, or Firm*—Harness, Dickey & Pierce, PLC

(57) ABSTRACT

An image forming apparatus includes a plurality of image bearing members configured to bear respective images, an optical writing unit configured to write the respective images on the plurality of image bearing members by deflecting a laser beam on a polygon mirror, a transfer unit configured to transfer the respective images onto an image receiving member, and a controlling unit configured to perform an adjustment of a difference in phase of respective rotation speeds between the plurality of image bearing members at a timing of one of non-image forming operations during a series of image forming operations performed by the plurality of image bearing members, the optical writing unit, and the transfer unit.

29 Claims, 7 Drawing Sheets

METHOD AND APPARATUS FOR IMAGE FORMING CAPABLE OF EFFECTIVELY ADJUSTING IMAGE SHIFTS

PRIORITY STATEMENT

The present patent application claims priority under 35 U.S.C. §119 upon Japanese patent application no. 2005-072313, filed in the Japan Patent Office on Mar. 15, 2005, the disclosure of which is incorporated by reference herein in its entirety.

BACKGROUND

A color image forming apparatus having a plurality of image bearing members has advantages in producing copies faster than that having a single image bearing member and disadvantages that causes color shifts in an image. When respective toner images formed on the plurality of image bearing members are transferred onto a transferring member that is, for example, an intermediate transfer member to directly receive the toner images thereon or a recording medium conveyed by a sheet transferring member, it is difficult to overlay the respective toner images on accurate positions thereof, and a misalignment of the toner images may produce color shift on the overlaid toner image.

The color shift in image may be caused by various factors, and one of which is an image shift due to misalignment of components.

The image shift due to misalignment of components is a deviation of color formed at constant intervals on an image in the sub-scanning direction toward which a surface of an image bearing member rotates. The deviation of color is caused by a misalignment of components of an optical writing unit writing an electrostatic latent image on the surface of an image bearing member by emitting a laser beam toward the surface of the image bearing member. The deviation of color is also caused by a misalignment of a plurality of image bearing members. The image shift due to misalignment of components can be adjusted by controlling the timing of writing an electrostatic latent image by a laser beam. In the controlling method, a reference pattern toner image is formed on each image bearing member and transferred onto a transferring member. The reference pattern toner image transferred onto the transferring member is detected by a sensor or an image reading unit. Based on an output signal of the sensor, the amount of color shift in image is calculated and the timing of writing the electrostatic latent image is adjusted. However, when an optical writing unit in which a plurality of laser beams are emitted toward a polygon mirror is used, the image shift having the amount smaller than that a pitch in the sub-scanning direction of consecutive main scanning lines of a laser beam deflected by one mirror cannot be adjusted because of the structure of the optical writing unit itself.

In this connection, Japanese Patent Laid-open Publication No. 2004-198630 discloses a technique in which a plurality of image bearing members have respective drive motors serving as driving sources so that respective rotation speeds or linear velocities of the plurality of image bearing members can be separately controlled to adjust the image shift, according to the detection result of the reference pattern toner images formed on an intermediate transfer belt serving as a transferring member. The adjusting method used in the above-described image forming apparatus can reduce the image shift having the amount smaller than that of a pitch in the sub-scanning direction of the consecutive main scanning lines of the laser beam by changing the rotation speed of each image bearing member to make the deviation from respective predetermined positions of the reference pattern toner images formed on the intermediate transfer belt become small.

Another factor which may cause the color shift in image is rotation speed variations. The color shift in image, that is, the image shift due to rotation speed variations is a deviation of linear velocity in one rotation period of an image bearing member.

Regarding the image shift due to rotation speed variations, Japanese Patent Laid-open Publication No. 2000-298385 discloses a technique in which an adjustment of the phase of deviation in linear velocity in one rotation period of each image bearing member. The adjustment of the phase may be performed when respective rotations of a plurality of image bearing members are controlled to stop after the image forming operations are completed.

The method of adjusting the phase employs markings for aligning the phase on a predetermined position of a drive gear mounted on a shaft of each image bearing member according to the measurement result of deviation in linear velocity in each image bearing member previously measured. When the plurality of image bearing members are controlled to stop rotating, a sensor detects the above-described markings. According to the detection results by the sensor, the rotation of each image bearing member is controlled to stop so that the stop position of the rotation of each image bearing member may fall on predetermined positions between the image bearing members.

To reduce the image shift due to misalignment of components and the image shift due to rotation speed variations simultaneously, the above-described disclosed techniques were attempted to use in combination, which resulted in finding the following problem.

When an adjustment of the image shift due to misalignment of components is performed for a target image bearing member while the target image bearing member and the other image bearing members are driven to rotate at a speed identical to each other, the target image bearing member is fine adjusted, which creates a slight difference in rotation speed between the target image bearing member and the other image bearing members. When the target image bearing member and the other image bearing members are continuously rotated with the difference in rotation speed to perform a series of image forming operations, a difference in phase of linear velocities of the target image bearing member and the other image bearing members gradually become greater. For this reason, even through an adjustment of the image shift due to rotation speed variations is performed, the phase difference in linear velocity between these image bearing members may become clear enough to fine a visible color shift during the series of image forming operations, which may deteriorate the image shift due to rotation speed variation.

SUMMARY OF THE INVENTION

One or more embodiments of the present invention has been made in view of the above-mentioned circumstances.

At least one embodiment of the present invention provides an image forming apparatus that can reduce (if not completely prevent) an image shift due to misalignment of components and/or rotation speed variations.

At least one embodiment of the present invention provides a method of adjusting an image shift caused on an image produced in the above-described novel image forming apparatus.

An embodiment of the present invention provides an image forming apparatus including a plurality of image bearing members configured to bear respective images, an optical writing unit configured to write the respective images on the plurality of image bearing members by deflecting a laser beam on a polygon mirror, a transfer unit configured to transfer the respective images onto an image receiving member, and a controlling unit configured to perform an adjustment of a difference in phase of respective rotation speeds between the plurality of image bearing members at a timing of one of non-image forming operations during a series of image forming operations performed by the plurality of image bearing members, the optical writing unit, and the transfer unit.

Such an image forming apparatus may further include a plurality of driving sources configured to separately drive the plurality of image bearing members corresponding thereto, an image reading unit configured to read the respective images formed on the image receiving member of the transfer unit, an image shift adjusting unit configured to calculate an amount of shift in the respective images on the image receiving member based on a reading result obtained by the image reading unit and adjust respective rotation speeds of the plurality of image bearing members so that an amount of an image shift smaller than that of a pitch in a sub-scanning direction of consecutive main scanning lines of the laser beam is reduced, a rotation position detecting unit configured to detect respective rotation positions of the plurality of image bearing members, and a phase difference adjusting unit configured to calculate an amount of the phase difference based on a detection result obtained by the rotation position detecting unit and adjust the phase difference according to a result obtained by the calculation.

An embodiment of the present invention provides a method of adjusting an image shift that includes the steps of forming respective images on a plurality of image bearing members by deflecting a laser beam on a polygon mirror in an optical writing unit, transferring the respective images onto an image receiving member of a transferring unit, reading the respective images formed on the image receiving member, calculating an amount of shift in the respective images based on a result of the reading step, adjusting respective rotation speeds of the plurality of image bearing members so that an amount of an image shift smaller than that of a pitch in a sub-scanning direction of consecutive main scanning lines of the laser beam is reduced, detecting respective rotation positions of the plurality of image bearing members, calculating an amount of a difference in phase of respective rotation speeds between the plurality of image bearing members based on a result of the detecting step, adjusting the phase difference according to the calculation result, and controlling an adjustment of the phase difference at a timing of one of non-image forming operations during a series of image forming operations.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLE EMBODIMENTS

Figure 1:
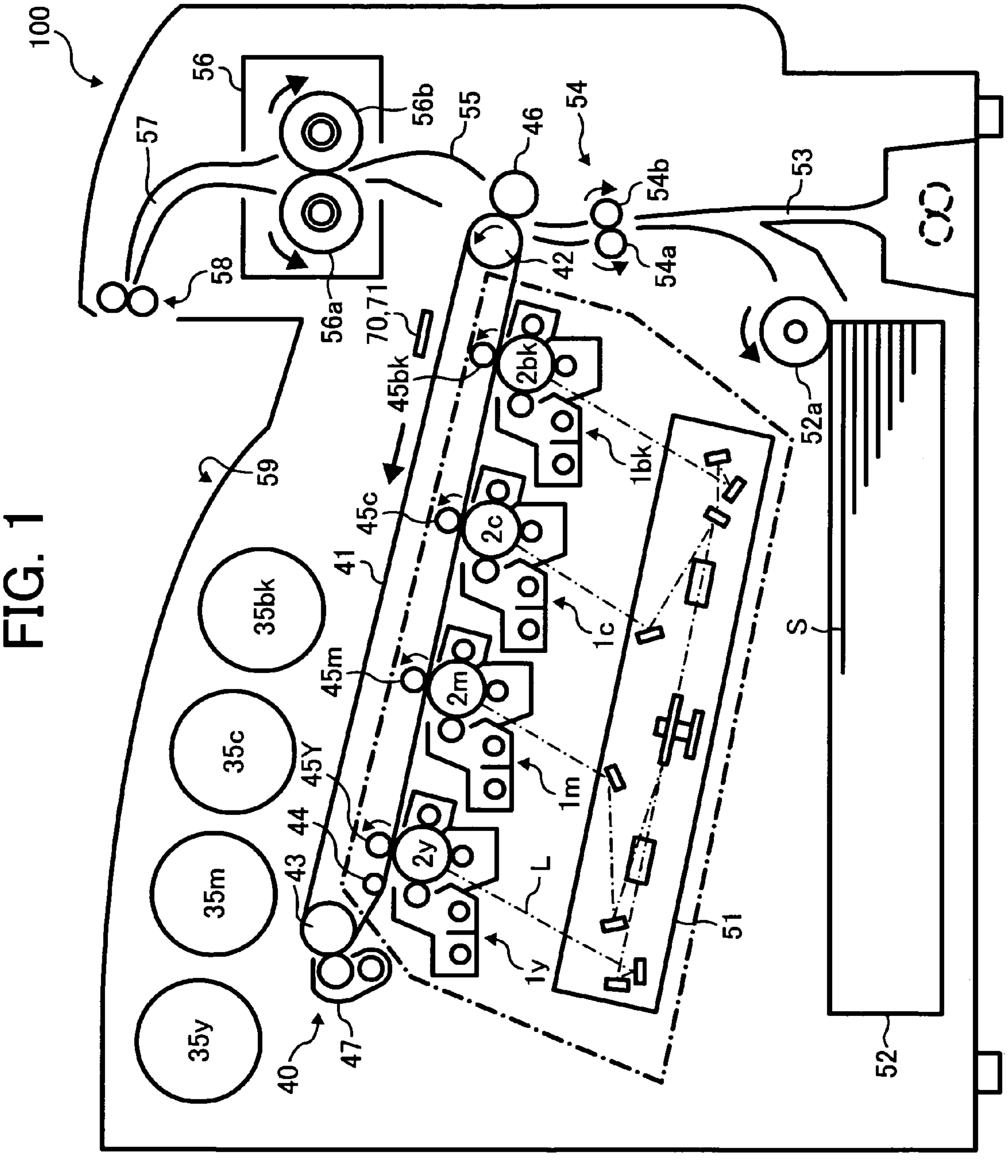
FIG. 1 is a schematic structure of a color printer (according to an example embodiment of the present invention)

It will be understood that if an element or layer is referred to as being "on," "against," "connected to" or "coupled to" another element or layer, then it can be directly on, against connected or coupled to the other element or layer, or intervening elements or layers may be present. In contrast, if an element is referred to as being "directly on", "directly connected to" or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present invention are described.

Figure 2:
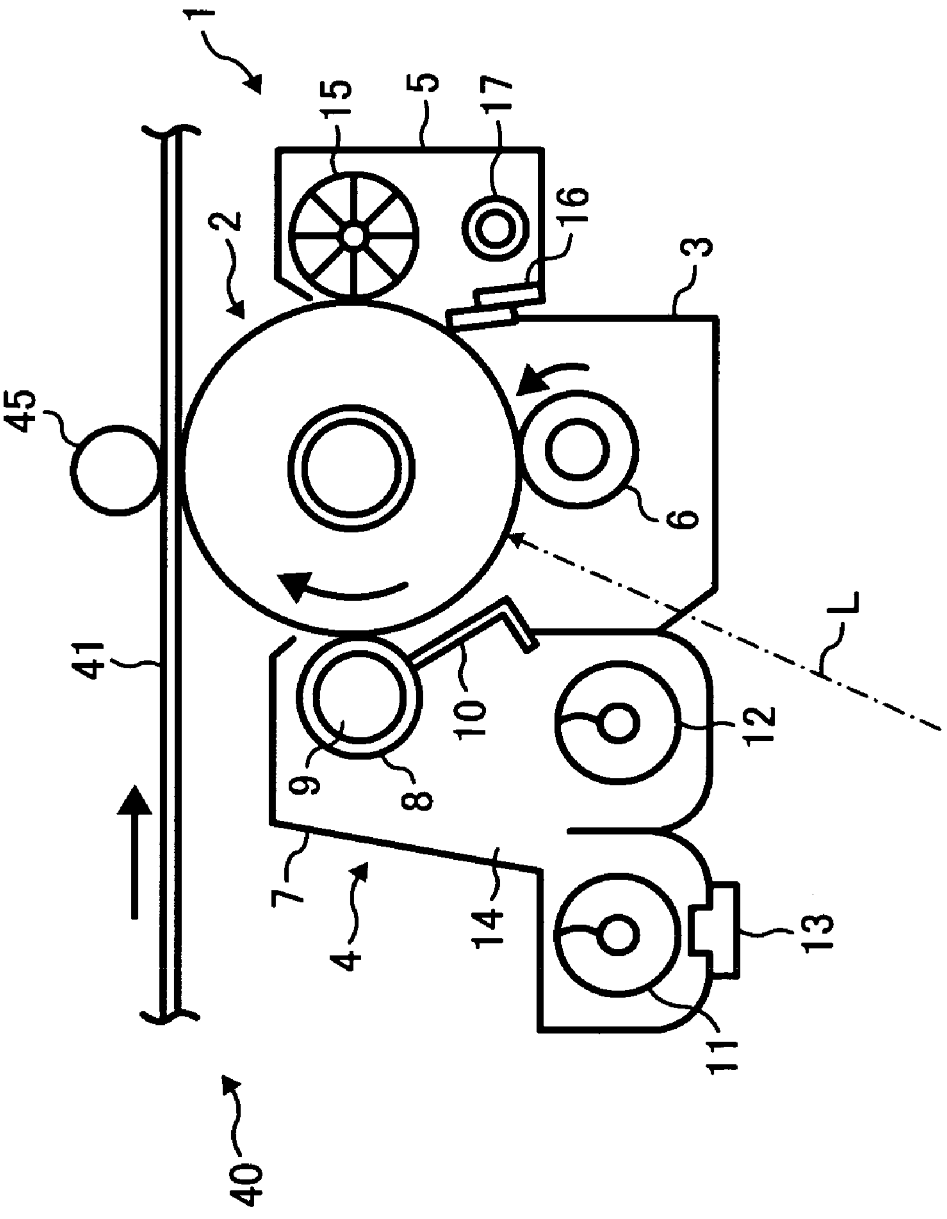
FIG. 2 is an enlarged view of a process cartridge with a portion of a transfer unit of the color printer of FIG. 1 (according to an example embodiment of the present invention)

Referring to FIGS. 1 and 2, a schematic structure of a tandem-type color printer 100 according to an example embodiment of the present invention is described. The tandem-type color printer 100 serves as an electrophotographic color image forming apparatus. Hereinafter, the tandem-type color printer 100 is referred to as a color printer 100.

In FIG. 1, the color printer 100 mainly includes four process cartridges 1*y*, 1*m*, 1*c*, and 1*bk* as an image forming mechanism, an optical writing unit 51 as an electrostatic latent image forming mechanism which is a part of the image forming mechanism, four toner bottles 35*y*, 35*m*, 35*c*, and 35*bk* as a toner feeding mechanism, a transfer unit 40 as a transfer mechanism, a sheet feeding cassette 52 as a sheet feeding mechanism, and a fixing unit 56 as a fixing mechanism.

The process cartridges 1*y*, 1*m*, 1*c*, and 1*bk* include respective consumable image forming components, such as photoconductive elements 2*y*, 2*m*, 2*c*, and 2*bk*, to perform image forming operations for producing respective toner images with toners of different colors of yellow (y), magenta (m), cyan (c), and black (bk).

The process cartridges 1*y*, 1*m*, 1*c*, and 1*bk* are separately arranged at positions having different heights in a stepped manner and are detachably provided to the color printer 100 so that each of the process cartridges 1*y*, 1*m*, 1*c*, and 1*bk* can be replaced at once at an end of its useful life. Since the four process cartridges 1*y*, 1*m*, 1*c*, and 1*bk* have similar structures and functions, except that respective toners are of different colors, which are yellow, magenta, cyan, and black toners, the discussion below uses reference numerals for specifying components of the color printer 100 without suffixes of colors such as y, m, c, and bk.

In FIG. 2, a schematic structure of a process cartridge 1 for producing a single color toner image.

The process cartridge 1 has image forming components around it. The image forming components included in the process cartridge 1 are the photoconductive element 2, a charging unit 3, a developing unit 4, a discharging unit (not shown), a drum cleaning unit 5, and so forth.

The photoconductive element 2 is a rotating member including a cylindrical conductive body having a relatively thin base. The photoconductive element 2 is driven by a rotation drive unit (not shown) and is rotated clockwise in the example depicted in FIG. 2. The photoconductive element 2 is rotated while contacting the surface of an intermediate transfer belt 41 of the transfer unit 40.

In printer 100, a drum type image bearing member such as the photoconductive element 2 is used. However, as an alternative, a belt type image bearing member may be applied as well.

The charging unit 3 includes a charging roller 6 that is held in contact with the photoconductive element 2. The charging roller 6 is applied with an alternating charged bias voltage by a power source (not shown). When the photoconductive element 2 is rotated, the charging unit 3 with the charging roller 6 applies the alternating charged bias voltage to the photoconductive element 2 to uniformly charge the surface of the photoconductive element 2 to a reference polarity.

In printer 100, a charging method using the charging roller 6 is used. However, as an alternative, another method such as a corona charging may be applied as well.

The developing unit 4 includes a developer case 7 with a developer container 14, a developing sleeve 8, and a magnet roller 9. The developing unit 4 also includes a doctor blade 10, first and second conveying screws 11 and 12, a toner density sensor or T-sensor 13, and so forth. The developing unit 4 develops the electrostatic latent image formed on the surface of the photoconductive element 2 as a single color toner image. Thus, the toner image is formed on the surface of the photoconductive element 2.

The developer case 7 has an opening facing the photoconductive element 2. The developing sleeve 8 is formed by a non-magnetic pipe and is arranged in the vicinity of the opening of the developer case 7 so that a part of the developing sleeve 8 can be disposed adjacent to the photoconductive element 2. The magnet roller 9 is concentrically formed inside the developing sleeve 8. The magnet is configured not to follow the rotation of the developing sleeve 8. The developer container 14 of the developer case 7 accommodates two-component developers including carriers in a form of magnetic particles and non-magnetic toner of different color corresponding to the image data. The first and second conveying screws 11 and 12 convey the two-component developer. When the two-component developer is conveyed to the vicinity of the developing sleeve 8, a magnetic force exerted by the magnet roller 9 causes the two-component developer to cling to the surface of the developing sleeve 8 in a magnetic brush arrangement.

The doctor blade 10 is disposed opposite to the surface of the developing sleeve 8 with a gap between them. The doctor blade 10 regulates the thickness of the magnet brush formed on the developing sleeve 8 before the two-component developer is conveyed to a developing area formed opposite to the photoconductive element 2. The developing area has a developing gap at a closest portion between the developing sleeve 8 and the photoconductive element 2. At and in the vicinity of the developing gap, a leading edge of the magnetic brush formed on the surface of the developing sleeve 8 moves while contacting the surface of the photoconductive element 2 so that the toner of different color is electrostatically adhered to the surface of the photoconductive element 2. With the above-described action of the developing sleeve 8, the electrostatic latent image formed on the surface of the photoconductive element 2 is developed to the toner image of the corresponding color.

After the toner image is formed, the two-component developer forming the above-described magnetic brush is conveyed back to the developer case 7 along with the rotation of the developing sleeve 8. The toner image, on the other hand, is primarily transferred onto a surface of the intermediate transfer belt 41.

The T-sensor 13 may be a permeability sensor, for example. The T-sensor 13 is fixed on the bottom plate of the developer case 7 to output a voltage according to the permeability of the two-component developer conveyed by the first conveying screw 11. Since the permeability of the two-component developer shows a favorable correlation with the toner density of the two-component developer, the T-sensor 13 can output the voltage according to the toner density of the corresponding color. The value of the output voltage is sent to the controlling unit 60.

The drum cleaning unit 5 includes a brush roller 15, a cleaning blade 16, a toner collecting screw 17, and so forth. The drum cleaning unit 5 removes residual toner on the surface of the photoconductive element 2 after the toner image formed on the surface of the photoconductive element 2 is transferred onto the transfer unit 40.

Referring back to FIG. 1, the optical writing unit 51 is a part of the image forming mechanism, and includes a power source (not shown), a rotational polygon mirror (not shown), and a plurality of lenses and mirrors such as f-theta lens (not shown) and reflection mirrors (not shown). The optical writing unit 51 emits four laser beams towards the photoconductive elements 2*y*, 2*m*, 2*c*, and 2*bk*. When the optical writing unit 51 emits a laser beam L toward the photoconductive element 2 of the process cartridge 1, the laser beam L is deflected by the rotational polygon mirror that is also driven by a motor. The laser beam L travels via the plurality of lenses and mirrors, and reaches the photoconductive element 2. The process cartridge 1 receives the laser beam L, which is optically modulated. The laser beam L, according to image data corresponding to a color of toner for the process cartridge 1, irradiates a surface of the photoconductive element 2 so that an electrostatic latent image is formed on the surface of the photoconductive element 2.

The four toner bottles 35*y*, 35*m*, 35*c*, and 35*bk* independently detachable from each other are included in a toner feeding unit 30 (see FIG. 3) and are arranged above the transfer unit 40. The toner bottles 35*y*, 35*m*, 35*c*, and 35*bk* are also separately provided with respect to the respective process cartridges 1*y*, 1*m*, 1*c*, and 1*bk*, and are detachably arranged to the color printer 100. With the above-described structure, each toner bottle may easily be replaced with a new toner bottle when the toner bottle is detected as being in a toner empty state, for example.

The transfer unit 40 is arranged above the process cartridges 1*y*, 1*m*, 1*c*, and 1*bk*. The transfer unit 40 includes the intermediate transfer belt 41, a drive roller 42, a cleaning backup roller 43, a tension roller 44, and four primary transfer rollers 45*y*, 45*m*, 45*c*, and 45*bk*. The transfer unit 40 also includes a secondary transfer roller 46 and a belt cleaning unit 47. The belt cleaning unit 47 removes residual toner adhering on the surface of the intermediate transfer belt 41.

The intermediate transfer belt 41 forms an endless belt extending over the drive roller 42, the cleaning backup roller 43, the tension roller 44, and the primary transfer rollers 45*y*, 45*m*, 45*c*, and 45*bk*, and rotating counterclockwise in FIG. 1. The intermediate transfer belt 41 is held in contact with the primary transfer rollers 45*y*, 45*m*, 45*c*, and 45*bk* serving as a primary transfer mechanism and corresponding to the photoconductive elements 2*y*, 2*m*, 2*c*, and 2*bk*, respectively, to form primary transfer nips between the photoconductive element 2*y* and the primary transfer roller 45*y*, between the photoconductive element 2*m* and the primary transfer roller 45*m*, and so forth.

As previously described, the photoconductive element 2 is rotated while contacting the surface of the intermediate transfer belt 41 of the transfer unit 40, by which a primary transfer nip is formed between the photoconductive element 2 and the intermediate transfer belt 41. When passing the primary transfer nip, the single toner image formed on the surface of the photoconductive element 2 is transferred onto the surface of the intermediate transfer belt 41. Corresponding to the photoconductive element 2 of FIG. 2, the primary transfer roller 45 is arranged at a position opposite to the photoconductive element 2 such that the toner image formed on the surface of the photoconductive element 2 is transferred onto the intermediate transfer belt 41. The primary transfer roller 45 is applied with an appropriate transfer voltage as a primary transfer bias by a transfer bias power source (not shown), which forms an electric field for the primary transfer nip between the intermediate transfer belt 41 and the photoconductive element 2.

The color printer 100 uses the primary transfer rollers 45*y*, 45*m*, 45*c*, and 45*bk* as the primary transfer mechanism. However, as an alternative, primary transfer brushes or primary transfer blades may be used.

The rollers except the primary transfer roller 45 are grounded.

The single color toner image, formed on the surface of the photoconductive element 2 of the process cartridge 1, is conveyed to the primary nip along with the rotation of the photoconductive element 2, and is transferred onto the surface of the intermediate transfer belt 41 under the influence of the electric field created by the transfer voltage and the nip pressure of the primary nip.

Through operations similar to those as described above, yellow, magenta, cyan, and black images are formed on the surface of the respective photoconductive elements 2*y*, 2*m*, 2*c*, and 2*bk*. The color toner images are sequentially overlaid on the surface of the intermediate transfer belt 41, such that a primary overlaid toner image is formed on the surface of the intermediate transfer belt 41. Hereinafter, the primary overlaid toner image is referred to as a four color toner image.

The sheet feeding cassette 52 accommodates a plurality of recording media such as transfer sheets that include an individual transfer sheet S. The sheet feeding mechanism also includes a sheet feeding roller 52*a*, a sheet conveying path 53, a pair of registration rollers 54 including first and second registration rollers 54*a* and 54*b*, and an intermediate conveying path 55. The sheet feeding roller 52*a* is held in contact with the transfer sheet S. The sheet feeding roller 52*a* is rotated by a sheet feeding motor 31 (see FIG. 3). The first registration roller 54*a* of the pair of registration rollers 54 is driven by a drive unit (not shown) to rotate in a counterclockwise direction of FIG. 1. The second registration roller 54*b*, the other roller of the pair of registration rollers 54, is held in contact with the first registration roller 54*a* and is rotated following the rotation of the first registration roller 54*a*.

The transfer sheet S placed on the top of a stack of transfer sheets in the sheet feeding cassette 52 is fed and is conveyed to a portion between the first and second registration rollers 54*a* and 54*b* of the pair of registration rollers 54. The first and second registration rollers 54*a* and 54*b* stop and feed the transfer sheet S in synchronization with a movement of the four color toner image towards a secondary transfer area, which is a secondary transfer nip formed between the drive roller 42 of the intermediate transfer belt 41 and the secondary transfer roller 46. The drive roller 42 and the secondary transfer roller 46 face each other, sandwiching the intermediate transfer belt 41. The secondary transfer nip holds an appropriate nip pressure. The secondary transfer roller 46 is applied with an appropriate transfer voltage by a power source (not shown), which forms an electric field for the secondary transfer. The four color toner image, formed on the surface of the intermediate transfer belt 41, is conveyed to the secondary transfer nip along with the rotation of the intermediate transfer belt 41, and is transferred onto the transfer sheet S under the influence of the electric field created by the transfer voltage and the nip pressure of the secondary transfer nip. The four color toner image transferred on the transfer sheet S is referred to as a full color toner image.

The transfer sheet S that has the full color toner image thereon is conveyed further upward, and passes between a pair of fixing rollers of the fixing unit 56.

The fixing unit 56 includes a fixing roller 56*a* having a heater therein and a pressure roller 56*b* for pressing the transfer sheet S for fixing the full color toner image to the transfer sheet S by applying heat and pressure. The fixing roller 56*a* is driven by a drive unit (not shown) to rotate in a counterclockwise direction in FIG. 1. The pressure roller 56*b* is held in contact with the fixing roller 56*a* and is rotated following the rotation of the fixing roller 56*a*. The fixing roller 56*a* and the pressure roller 56*b* form a fixing nip. The fixing roller 56*a* includes a heater such as a halogen lamp. The controlling unit 60 (see FIG. 3) controls the power switching of the fixing roller 56*a* so that the surface temperature of the fixing roller 56*a* is kept between approximately 140° C. and approximately 160° C. The transfer sheet S passes the fixing nip of the fixing unit 56 with the side having the full color toner image thereon contacting the fixing roller 56*a*. Thus, the full color toner image is fixed to the transfer sheet S by applying heat and pressure.

After passing the fixing unit 56, the transfer sheet S is conveyed to a sheet reversing path 57 that is formed between two sheet reversing guide plates (not shown). The transfer sheet S is then vertically reversed before being discharged via a pair of sheet discharging rollers 58 to a sheet discharging tray 59 provided at the upper portion of the color printer 100.

The color printer 100 also includes sensors 70 and 71 and a controlling unit 60 (see FIG. 3), which will be described later.

Figure 3:
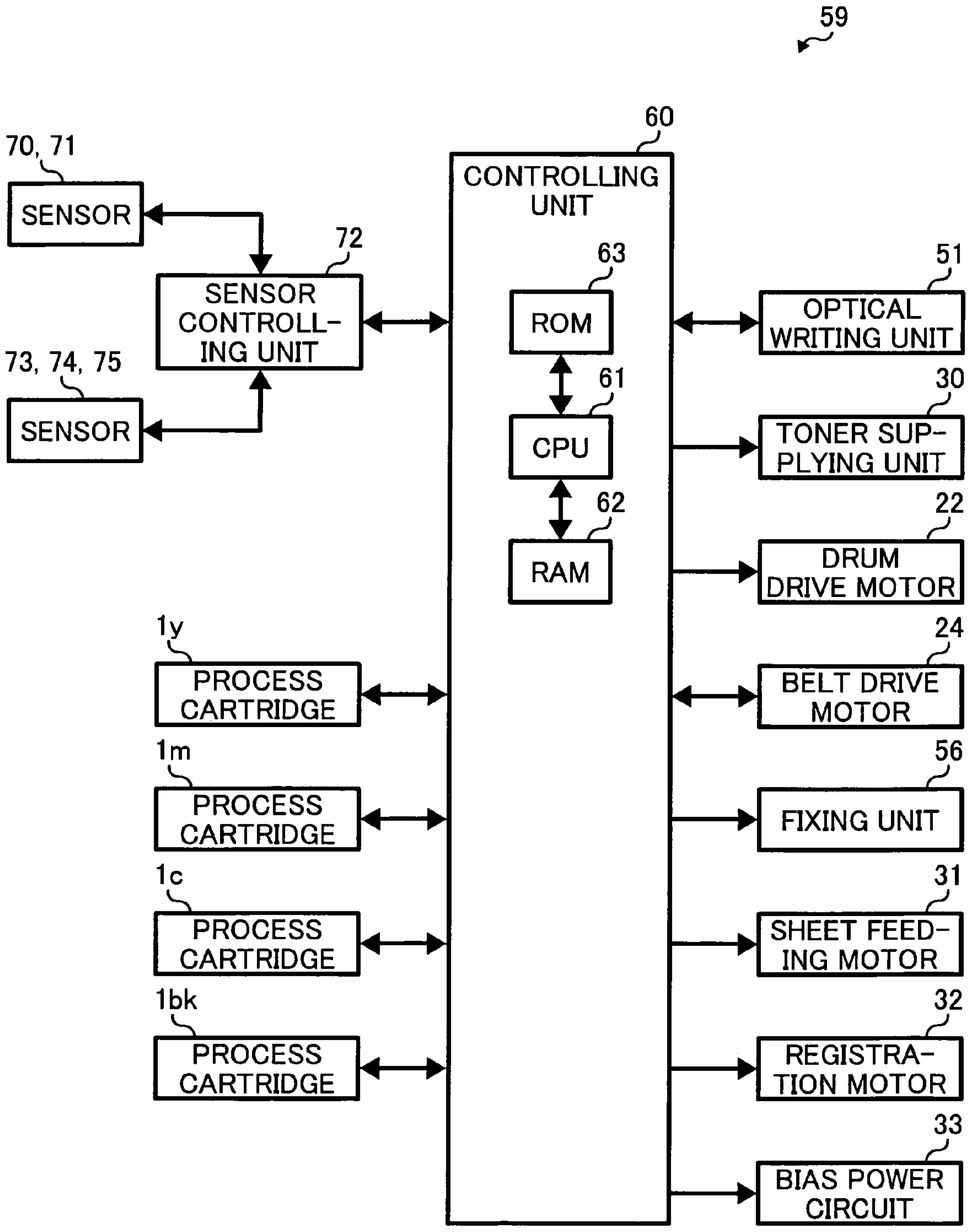
FIG. 3 is a block diagram showing a control system (according to an example embodiment of the present invention) of the color printer of FIG. 1.

Referring to FIG. 3, a block diagram showing a control system 59 of the color printer 100 is (according to an example embodiment of the present invention) described.

In FIG. 3, the control system 59 of the color printer 100 includes the controlling unit 60. The controlling unit 60 performs drive controls of each device included in the color printer 100. The controlling unit 60 also performs calculations to obtain values such as a target value used for the drive controls.

The controlling unit 60 includes a CPU (central processing unit) 61, a RAM (random access memory) 62, a ROM (read only memory) 63, and an I/O (input and output) interface (not shown). The controlling unit 60 is connected to the optical writing unit 51, the toner feeding unit 30, a drum drive mechanism 22 including drum drive motors 20*y*, 20*m*, 20*c*, and 20*bk* (see FIG. 4), a belt drive motor 24, the fixing unit 56, and the process cartridges 1*y*, 1*m*, 1*c*, and 1*bk*.

The controlling unit 60 is also connected to a sensor controlling unit 72, a sheet feeding motor 31, a registration motor 32, and a bias supply circuit 33. The sheet feeding motor 31 drives the sheet feeding roller 52*a* of the sheet feeding cassette 52 to rotate. The registration motor 32 drives the first registration roller 54*a* of the pair of registration rollers 54 to rotate. The bias supply circuit 33 generates the above-described primary transfer bias, secondary transfer bias, and developing bias.

The sensor controlling unit 72 is connected to the sensors 70 and 71, which are shown in FIG. 1, and sensors 73, 74, and 75. The sensor control circuit 72 controls the drives of these sensors 70, 71, 73, 74, and 75 to read reference pattern toner images and marks based on a control signal sent from the controlling unit 60 and sends a detection signal sent from these sensors 70, 71, 73, 74, and 75 to the controlling unit 60. The reference pattern toner images and marks will be described later.

The controlling unit 60 stores target data of each control into storing units such as RAM and ROM. For example, target data of frequency of a reference clock supplied to each of the drum drive motors 20*y*, 20*m*, 20*c*, and 20*bk*, target data of a reference timing for irradiating the laser beam to write an electrostatic latent image on each of the photoconductive elements 2*y*, 2*m*, 2*c*, and 2*bk*, target data of adjusting phase difference of the rotation of a photoconductive element with respect to a reference photoconductive element, and so forth are stored in the controlling unit 60.

The controlling unit 60 also stores data such as Vtref data that is a target value of the output voltage from the T-sensor 13 for each color of toner used in the color printer 100.

When driving the developing unit 4, the controlling unit 60 compares an actual output voltage of the T-sensor 13 and the Vtref data and, according to the result of the comparison, determines the period of time to drive the toner feeding unit 30 connected to the corresponding toner bottle of the toner bottles 35*y*, 35*m*, 35*c*, and 35*bk* shown in FIG. 1. With the above-described operation, the toner in the corresponding toner bottle is supplied to the developer container 14 of the developing unit 4 to restore the level of the toner density of the two-component developer that is decreased according to the developing operation.

With the control system 59 described above, operations of image forming according to the example embodiment of the present invention are performed as described below.

When the color printer 100 receives full color image data, each of the photoconductive elements 2*y*, 2*m*, 2*c*, and 2*bk* rotates in a clockwise direction in FIG. 1. Each photoconductive element 2 is uniformly charged with the charging roller 6. The optical writing unit 51 irradiates the photoconductive elements 2*y*, 2*m*, 2*c*, and 2*bk* of the process cartridges 1*y*, 1*m*, 1*c*, and 1*bk* with the laser light beams L corresponding to the respective color image data, resulting in formation of electrostatic latent images, which correspond to the respective color image data, on respective surfaces of the photoconductive elements 2*y*, 2*m*, 2*c*, and 2*bk*. The electrostatic latent image formed on the photoconductive element 2 is developed with the corresponding developer including color toner different from other color toners at the developing unit 4. The process cartridges 1*y*, 1*m*, 1*c*, and 1*bk* perform the above-described operation, resulting in formation of yellow, magenta, cyan, and black toner images on the respective photoconductive elements 2*y*, 2*m*, 2*c*, and 2*bk*.

At the primary transfer nip, the respective color toner images are sequentially transferred onto the surface of the intermediate transfer belt 41 to be overlaid as the four color toner image.

After each color toner image is transferred by passing the corresponding primary transfer nip, the photoconductive element 2 having the residual charge remaining on the surface thereof is discharged by the discharging unit (not shown), then passes a portion facing the drum cleaning unit 5. The drum cleaning unit 5l causes the brush roller 15 to apply a lubricant on the surface of the photoconductive element 2, and causes the cleaning blade 16 to remove residual toner from the surface of the photoconductive element 2. The drum cleaning unit 5 then uses the toner collecting screw 17 to convey the residual toner toward a used toner collecting bottle (not shown). Thus, the photoconductive element 2 after the residual toner is removed therefrom becomes ready to be charged by the charging unit 3 for the next image forming operation.

The recording sheet S is fed from the sheet feeding cassette 52. The recording sheet S is fed in synchronization with the pair of registration rollers 54 so that the four color toner image formed on the intermediate transfer belt 41 is transferred onto a proper position of the recording sheet S.

The four color toner image on the recording sheet S is then fixed by the fixing unit 56 through the application of heat and pressure. The recording sheet S having the fixed full color image is fed through the passage depending on image forming instructions. Specifically, the recording sheet S is discharged to the sheet discharging tray 59 after passing through the sheet reversing path 57 and between the pair of sheet discharging rollers 58. When a request producing two or more copies is specified, the image forming operation described above is repeated.

After the full color toner image is transferred, the belt cleaning unit 47 cleans the surface of the intermediate transfer belt 41 so as to prepare for the next image forming operation.

Figure 4:
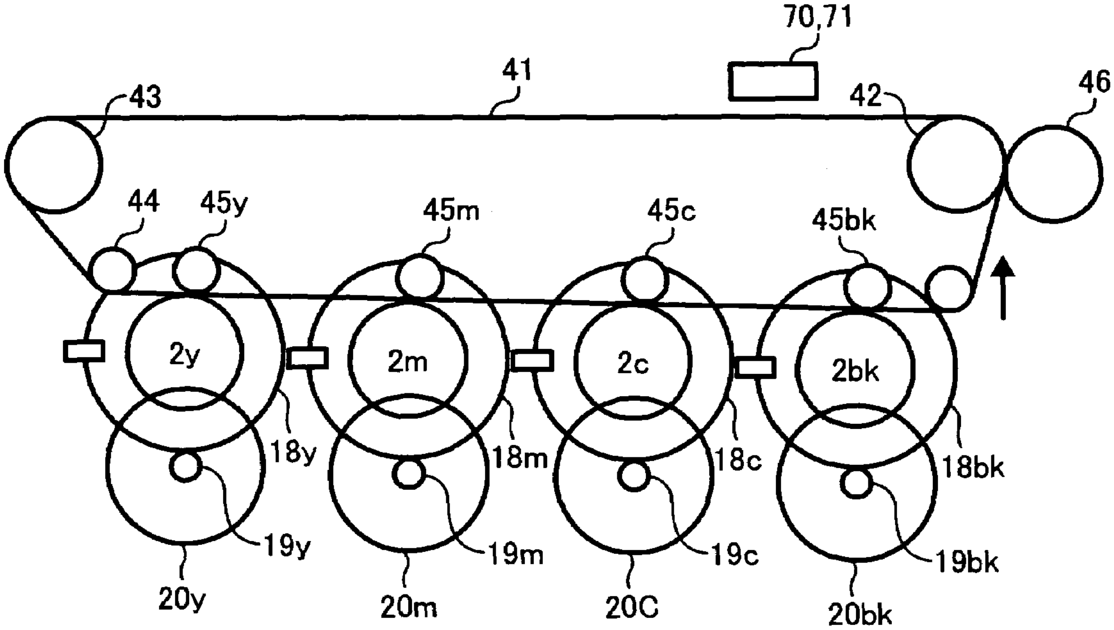
FIG. 4 is a schematic structure of a driving system (according to an example embodiment of the present invention) of the color printer of FIG. 1.

Referring to FIG. 4, a schematic structure of a driving system decreasing a color shift in color toner images transferred onto a transfer sheet in the color printer 100 is described, according to an example embodiment of the present invention.

The photoconductive element 2*y*, 2*m*, 2*c*, and 2*bk* are configured to rotate concentrically with respective rotating shafts (not shown). Respective photoconductive element drive gears 18*y*, 18*m*, 18*c*, and 18*bk* are disposed in the vicinity of one end of the respective rotating shafts. On respective inward sides of the photoconductive element drive gears 18*y*, 18*m*, 18*c*, and 18*bk*, the drum drive motors 20*y*, 20*m*, 20*c*, and 20*bk* that serve as driving sources are disposed, respectively. The drum drive motors 20*y*, 20*m*, 20*c*, and 20*bk* includes motor gears 19*y*, 19*m*, 19*c*, and 19*bk*, respectively, which are fixed to the respective drive shafts. More specifically, the drum drive motors 20*y*, 20*m*, 20*c*, and 20*bk* are configured to drive to separately rotate the photoconductive element 2*y*, 2*m*, 2*c*, and 2*bk*, and the motor gears 19*y*, 19*m*, 19*c*, and 19*bk* mesh with the photoconductive element drive gears 18*y*, 18*m*, 18*c*, and 18*bk*, respectively.

In the above-described system driving the photoconductive elements 2*y*, 2*m*, 2*c*, and 2*bk*, when the drum drive motors 20*y*, 20*m*, 20*c*, and 20*bk* start rotating, the respective torques of the drum drive motors 20*y*, 20*m*, 20*c*, and 20*bk* are transmitted via the motor gears 19*y*, 19*m*, 19*c*, and 19*bk*, respectively, to the photoconductive element drive gears 18*y*, 18*m*, 18*c*, and 18*bk*, respectively. The above-described operation causes the photoconductive elements 2*y*, 2*m*, 2*c*, and 2*bk* to separately rotate in the clockwise direction in FIG. 4.

The transfer unit 40 of the color printer 100 has a secondary (not shown) in the vicinity of one end of a rotating shaft of the drive roller 42 that drives the intermediate transfer belt 41. On the other hand, a belt drive motor (not shown) is disposed at the lower right of the drive roller 42 in FIG. 4. The belt drive motor has a pulley (not shown) which is fixed to the rotating shaft. The secondary and pulley are plate-shaped and have a V-shaped gutter along the circumferences thereof so that the secondary and pulley can engage with a V-shaped belt (not shown) while extending the V-shaped belt with an appropriate amount of tension. When the belt drive motor 24 is rotated, the torque of the belt drive motor 24 is transmitted to the pulley, V-shaped belt, secondary, and drive roller 42 sequentially so that the intermediate transfer belt 41 can be rotated in the counterclockwise direction in FIG. 4.

In the color printer 100 having the above-described driving system for the photoconductive elements 2*y*, 2*m*, 2*c*, and 2*bk* and the intermediate transfer belt 41, a color shift in image may occur when the toner images are overlaid on the intermediate transfer belt 41. The color shift in image may be caused by misalignment of components and/or rotation speed variations. The color shift in image due to misalignment of components may occur between the toner images in the sub-scanning direction due to misalignment of components of the components of the optical writing unit 51 and/or the photoconductive elements 2*y*, 2*m*, 2*c*, and 2*bk*. The color shift in image due to rotation speed variations may occur between the toner images due to a variation of the rotation speed of a photoconductive element in one rotation period.

Figure 5:
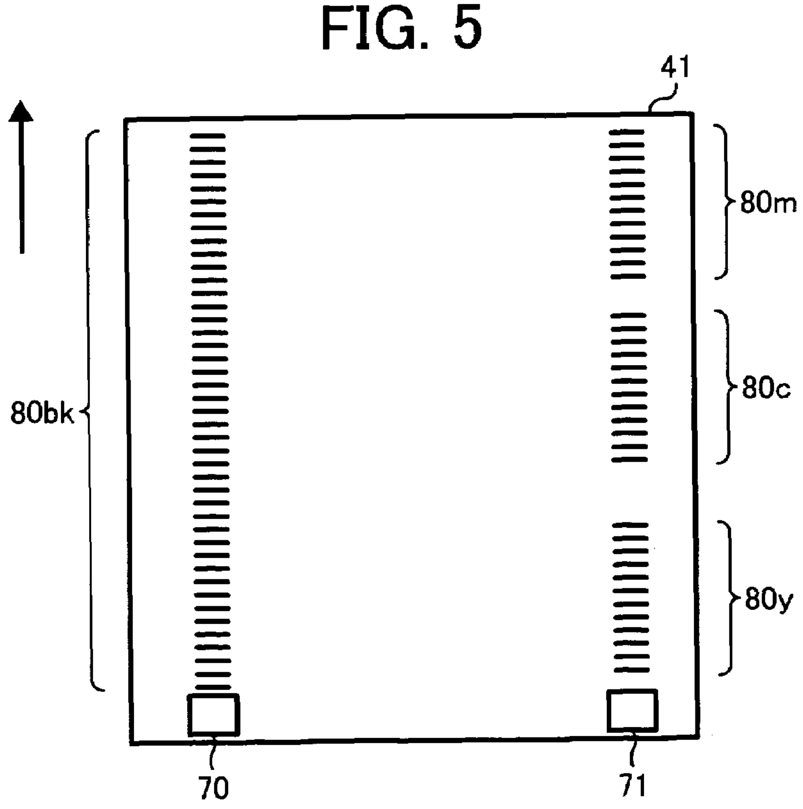
FIG. 5 shows reference pattern toner images formed on an intermediate transfer member and sensors reading the reference pattern toner images (according to an example embodiment of the present invention)

The color printer 100 performs the following controls with the controlling unit 60 to reduce the amount of the color shift due to misalignment of components, in reference to FIG. 5 (according to an example embodiment of the present invention).

Electrostatic latent images of respective reference patterns are formed on the photoconductive elements 2*y*, 2*m*, 2*c*, and 2*bk* and developed to form reference pattern toner images 80*y*, 80*m*, 80*c*, and 80*bk*. The developed reference pattern toner images 80*y*, 80*m*, 80*c*, and 80*bk* are then transferred onto ends in the width direction of the surface of the intermediate transfer belt 41 as shown in FIG. 5. The reference pattern toner image 80*bk* that represents a black toner image is formed at one end of the intermediate transfer belt 41, and the reference pattern toner images 80*y*, 80*m*, and 80*c* are formed at the other end. The reference pattern toner images 80*y*, 80*m*, 80*c*, and 80*bk* form image patterns (i.e., line images having an appropriate length) are printed at intervals. The reference pattern toner images 80*y*, 80*m*, 80*c*, and 80*bk* formed on the intermediate transfer belt 41 are read by the sensors 70 and 71 that are reflective optical sensors serving as image reading units.

The controlling unit 60 calculates the amount of color shift in each reference pattern toner image formed on the intermediate transfer belt 41 based on a reading result obtained by the sensors 70 and 71. Based on the reading result, the controlling unit 60 adjusts the color shift in image as described below.

When the amount of the color shift due to misalignment of components is greater than the amount of the pitch in the sub-scanning direction of the consecutive main scanning lines of a laser beam deflected by one surface of a polygon mirror, the controlling unit 60 controls the optical writing unit 51 to change the timing of irradiating the laser beam so that the amount of the color shift can be reduced.

When the amount of the color shift due to misalignment of components is smaller than the amount of the pitch in the sub-scanning direction of the consecutive main scanning lines of the laser beam, the controlling unit 60 controls the drum drive motors 20*y*, 20*m*, 20*c*, and 20*bk* to change respective rotation speeds of the photoconductive elements 2*y*, 2*m*, 2*c*, and 2*bk* so that the amount of the image shift can be reduced.

More specifically, the controlling unit 60 changes frequencies of respective reference clocks which are input to the drum drive motors 20*y*, 20*m*, 20*c*, and 20*bk* according to the amount of color shift in image obtained based on the reading result by the sensors 70 and 71, thereby changing the respective rotation speeds of the photoconductive elements 2*y*, 2*m*, 2*c*, and 2*bk*. Thus, the controlling unit 60 controls to reduce the amount of the color shift due to misalignment of components by serving as an image shift adjusting unit.

Further, to reduce the amount of the color shift in image due to rotation speed variations, the color printer 100 causes the controlling unit 60 to detect respective rotation positions of the photoconductive elements 2*y*, 2*m*, 2*c*, and 2*bk* by using the optical sensor 73 serving as a rotation position detecting unit.

Figure 6:
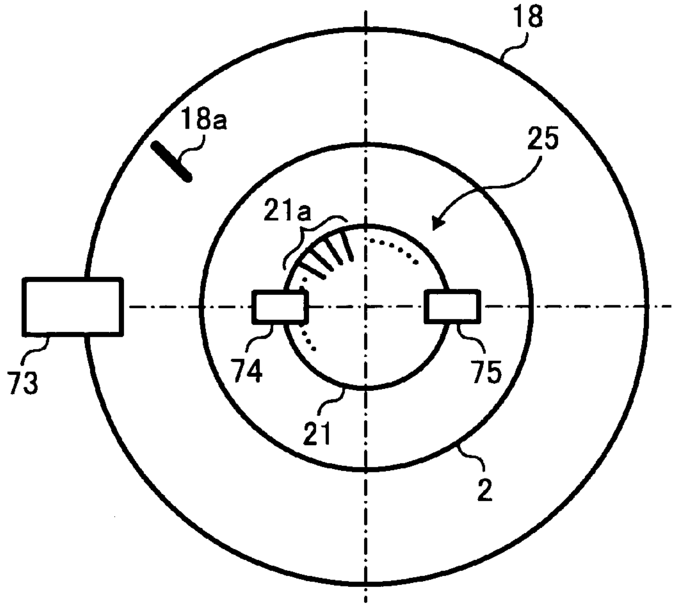
FIG. 6 is a schematic structure of a system (according to an example embodiment of the present invention) that detects a rotation position of a photoconductive element included in the process cartridge of FIG. 2.

Referring to FIG. 6, a schematic structure of a system (according to an example embodiment of the present invention) that detects a rotation position of the photoconductive element 2 is described. Since the four photoconductive elements 2*y*, 2*m*, 2*c*, and 2*bk* and the four photoconductive element drive gears 18*y*, 18*m*, 18*c*, and 18*bk* corresponding to the photoconductive elements 2*y*, 2*m*, 2*c*, and 2*bk*, respectively, have similar structures and functions, except that respective toners are of different colors, the discussion below uses reference numerals for specifying components of the color printer 100 without suffixes of colors such as y, m, c, and bk.

In FIG. 6, the optical sensor 73 serving as the rotation position detecting unit is disposed facing the edge of the circumference of the photoconductive element drive gear 18. The optical sensor 73 detects a detection target part 18*a* mounted at a position in a rotation direction of the circumference of the photoconductive element drive gear 18. The detection target part 18*a* is used to adjust a rotation phase of the photoconductive element 2 when the photoconductive element 2 and the photoconductive element drive gear 18 are mounted on the color printer 100. The detection target part 18*a* can be a marking or a notch having a color that can be detected by the optical sensor 73.

The controlling unit 60 calculate respective phase differences of rotations of the photoconductive elements 2*y*, 2*m*, 2*c*, and 2*bk* according to the results detected by the rotation position detecting unit. The controlling unit 60 then controls the respective rotation speeds of the photoconductive elements 2*y*, 2*m*, 2*c*, and 2*bk* to adjust the respective phases of rotations of the photoconductive elements 2*y*, 2*m*, 2*c*, and 2*bk* based on the calculation results of the respective phase differences.

A specific example of control to reduce the amount of the color shift due to rotation speed variations is to change the rotation speed of a drum drive motor driving a photoconductive element. For example, when the photoconductive element 2*m* has a phase difference to be adjusted with respect to the photoconductive element 2*bk*, the controlling unit 60 causes the drum drive motor 20*m* that drives the photoconductive element 2*m* to gradually change the rotation speed thereof, starting from the regular image forming operation. When the phase difference reaches a threshold value, the controlling unit 60 causes the drum drive motor 20*m* to change the rotation speed back to that of the regular image forming operation.

When a motor that can accurately stop the drum drive motor is a stepping motor, for example, the controlling unit 60 controls the drum drive motor separately driving each of the photoconductive elements 2*y*, 2*m*, 2*c*, and 2*bk* to stop at a position that can provide a threshold phase difference sufficient to change the speed of the drum drive motor back to the speed for a regular image forming operation.

Thus, the controlling unit 60 also works as a phase difference adjusting unit that can adjust the respective phase differences of rotations of the photoconductive elements 2*y*, 2*m*, 2*c*, and 2*bk* so that the amount of the color shift due to rotation speed variations can be reduced.

The threshold phase difference can be set as described below. For example, variations of respective rotation speeds of the photoconductive elements are preliminarily measured in the process of production of the color printer. According to the measurement results, the threshold phase difference for reducing the amount of the image shift can be set. Further, when the reference pattern toner images as shown in FIG. 5 are formed on the surface of the intermediate transfer belt 41, the reference pattern toner image for black is designated as a reference image to set the threshold phase difference to reduce (if not minimize) the amount of the image shift of the other reference pattern toner images for yellow, magenta, and cyan. The respective rotation positions of the drum drive gears 18*y*, 18*m*, and 18*c* corresponding to the respective phase differences are measured as target rotation positions. To achieve the target rotations positions previously measured, the rotation positions of the drum drive gears 18*y*, 18*m*, 18*c*, and 18*bk* are controlled to obtain the threshold phase differences.

The threshold phase difference may be set based on outputs from an encoder 25 serving as a rotation displacement detecting unit mounted on each photoconductive element 2 at the central axis of a rotation of each photoconductive element 2, as shown in FIG. 6. The encoder 25 includes a code wheel 21 having code patterns 21*a*, and the photosensors 74 and 75. The code wheel 21 is fixedly mounted on each photoconductive element 2 at the central axis of the rotation of each photoconductive element 2. The code patterns 21 a are circumferentially marked on the code wheel 21. The photosensors 74 and 75 are disposed opposite to the code patterns 21*a* to detect the code patterns 21*a* on the code wheel 21. Based on the detection results obtained by the encoder 25, variations of the rotation speed of the photoconductive element 2 can continuously be detected, thereby setting the threshold phase difference to control. Compared to the method using the reference pattern toner images, the method using such encoder can reduce the amount of toner consumption.

Figure 7:
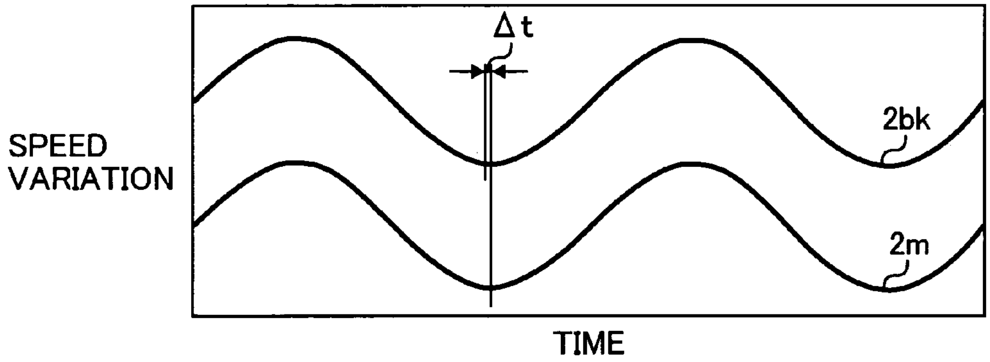
FIG. 7 is a graph showing a phase difference in rotations between an image bearing member for black toner images and an image bearing member for magenta toner images immediately after an adjustment of the phase difference is performed (according to an example embodiment of the present invention)

A conventional color image forming apparatus has not adjusted the phase different to reduce the color shift due to rotation speed variations at a timing in which a photoconductive element starts its rotation and a series of image forming operations begins and/or at a timing in which the series of image forming operation is completed and the photoconductive element stops its rotation. Therefore, the phase difference immediately after the adjustment of the phase difference performed at the above-described timings is adjusted to have a threshold phase difference ($\Delta t \neq 0$) of distance between, for example, the photoconductive elements 2*m* and 2*bk* as shown in FIG. 7 (according to an example embodiment of the present invention). The expression "$\alpha t$" shown in FIG. 7 represents a delay time of the rotation phase of the photoconductive element 2*m* with respect to that of the photoconductive element 2*bk* serving as a reference photoconductive element.

Figure 8:
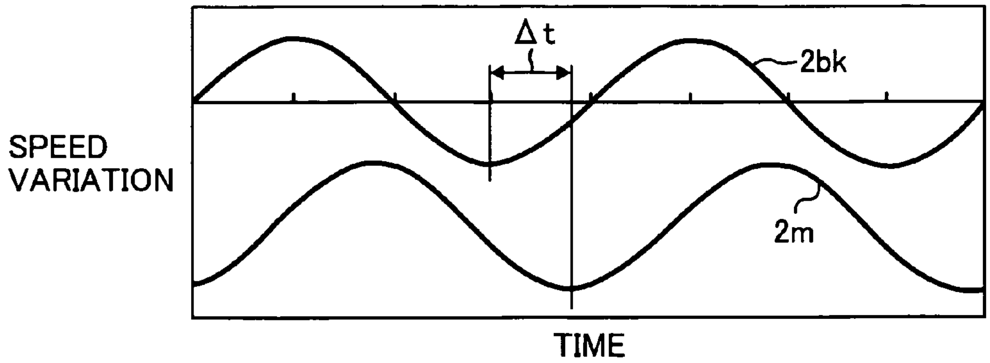
FIG. 8 shows a graph showing a phase difference in rotations between an image bearing member for black toner images and an image bearing member for magenta toner images when a series of color image forming operations are repeatedly performed after an adjustment of the phase difference is performed (according to an example embodiment of the present invention)

Conventionally when the adjustment of the respective rotation speeds of the photoconductive elements 2*y*, 2*m*, 2*c*, and 2*bk* was performed to reduce the image shift due to misalignment of components, differences in rotation speeds between the photoconductive elements 2*y*, 2*m*, 2*c*, and 2*bk* might occur because of the color shift in image due to rotation speed variations. Even after the above-described differences in rotation speeds occur in the adjustment of the image shift due to misalignment of components, when a command for printing is received and a series of color image forming operations are repeatedly performed, the phase difference of rotations of the photoconductive elements can gradually deviate from the threshold phase difference. FIG. 8 shows a variation of the phase difference in rotation speeds of the photoconductive elements 2*m* and 2*bk* (according to an example embodiment of the present invention). When the phase difference in rotation speed of each photoconductive element deviated as shown in FIG. 8, the color shift due to rotation speed variations might become greater to cause a visible color shift.

In the color printer 100, the controlling unit 60 controls to perform the previously described adjustment of the phase difference during the process of a series of color image forming operations repeatedly performed after receiving the command for printing. More specifically, the adjustment of the phase difference is performed at least at a timing of one non-image forming operation between the plurality of image forming operations. Hence, when the controlling unit 60 performs the adjustment of the phase difference, the phase difference of the photoconductive elements 2*m* and 2*bk*, for example, can be adjusted as shown in FIG. 7, thereby degradation in color shift in image due to rotation speed variations between the toner images formed on the intermediate transfer belt 41 may be presented.

As described above, the color printer 100 according to the example embodiment of the present invention can control an amount of the image shift due to misalignment of components smaller than the amount of the pitch in the sub-scanning direction of the consecutive main scanning lines of the laser beam while reducing (if not completely preventing) the color shift due to rotation speed variations for a series of image forming operations repeatedly performed.

Further, the color printer 100 can determine a non-image forming timing to adjust the above-described phase difference according to the amount of image shift calculated based on the detection results by reading the reference pattern toner images 80*y*, 80*m*, 80*c*, and 80*bk* by the sensors 70 and 71. In this case, the degree of increase of the phase difference in rotation of each photoconductive element after the series of image forming operations is started and the degree of increase of the image shift because of the increase of amount of the phase difference may vary due to the amount of the rotation speed of the photoconductive element when the amount is changed to reduce the image shift due to misalignment of components. To reduce (if not completely prevent) the variation in degrees of increase described above, the controlling unit 60 causes the sensors 70 and 71 to read the reference pattern toner images 80*y*, 80*m*, 80*c*, and 80*bk*. The controlling unit 60 takes a non-image timing that comes first after the amount of image shift obtained based on the results detected by the sensors 70 and 71 becomes great to make the color shift in image visible and determines the non-image timing as the non-image forming timing for adjusting the phase difference. By determining the above-described non-image forming timing for adjusting the phase difference, useless adjustments of the phase difference can be avoided and the series of image forming operations repeatedly performed may not delay by virtue of the adjustment of the phase difference.

Table 1 shows a result of an experiment showing the degree of phase difference between photoconductive elements when toner images are formed on a transfer sheet in the process of a series of image forming operations according to the amount of adjustment of color shift in image to reduce the image shift due to misalignment of components. The result shown in Table 1 was obtained under the example conditions in which an outer diameter of the photoconductive element 2 is Φ 40 mm, an angle between the optical writing unit 51 and the primary transfer mechanism from the central axis of rotation of the photoconductive element 2 is 147 degrees, and a surface speed of the photoconductive element 2 is 205 mm/sec.

When the amount of the color shift is adjusted by 10 μm, 310 sheets of A4 paper in a landscape mode can be processed before producing the phase difference having an angle of 45 degrees. However, when the amount of the color shift is adjusted by 20 μm, the number of sheets, e.g., of A4 paper to be processed in the landscape mode decreases to 155. Therefore, when the amount of the color shift to be adjusted is 20 μm, the adjustment of the phase difference can be performed after approximately 155 sheets of A4 paper are sequentially processed. Similarly, when the amount of the color shift to be adjusted is 10 μm, the adjustment of the phase difference can be performed after approximately 310 sheets of A4 paper are sequentially processed.

Similar to the above-described adjustment of the phase difference, the timing of performing the adjustment of the phase difference can be determined according to the amount of the color shift to be adjusted. The determination of timing can reduce (if not completely prevent) a delay time of the image forming operations repeatedly performed and can keep rotation speed variations in a constant range.

| Adjusted amount of color shift (μm) | Linear velocity of photoconductive element after adjustment (mm/sec) | Adjusted amount of reference clock frequency (%) | A4 paper sequentially processed in landscape mode before phase difference of 45 degree (Number of sheets) |
|---|---|---|---|
| 0 | 205.000 | 0.000 | 0 |
| 10 | 205.040 | 0.019 | 310 |
| 20 | 205.080 | 0.039 | 155 |

The color printer 100 can also determine respective target adjusted values of the phase differences of the respective photoconductive elements 2 according to the amount of displacement of the reference pattern toner images formed on the respective photoconductive elements 2 and transferred to the intermediate transfer belt 41. In this case, the color printer 100 uses the amounts of displacement of the reference pattern toner images transferred onto the intermediate transfer belt 41, which are formed on the intermediate transfer belt 41 closer to respective toner images formed in the process of the actual image forming operations. Thereby, the target adjusted values of the phase difference can be accurately determined so that the image shift may not occur in a color toner image formed in the process of the actual image forming operations.

The color printer 100 can also determine respective target adjusted values of the phase differences of the respective photoconductive elements 2 according to the outputs of the encoder 25 mounted on each photoconductive element 2 at the central axis of the rotation of the photoconductive element 2. Different from using the reference pattern toner images, the amount of toner consumption can be reduced.

Further, the color printer 100 can have a structure in which the respective photoconductive elements 2*y*, 2*m*, 2*c*, and 2*bk* and the intermediate transfer belt 41 can be detached and contacted. More specifically, the intermediate transfer belt 41 is held in contact with the photoconductive elements 2*y*, 2*m*, 2*c*, and 2*bk* during the series of image forming operations and is separated from the photoconductive elements 2*y*, 2*m*, 2*c*, and 2*bk* after the image forming operations are completed. The adjustment of the phase difference of the photoconductive elements 2*y*, 2*m*, 2*c*, and 2*bk* can therefore be controlled after the intermediate transfer belt 41 is separated from the photoconductive elements 2*y*, 2*m*, 2*c*, and 2*bk*. After the adjustment of the phase difference is completed, the controlling unit 60 causes the intermediate transfer belt 41 to contact the photoconductive elements 2*y*, 2*m*, 2*c*, and 2*bk* again to perform the next image forming operation.

Figure 9:
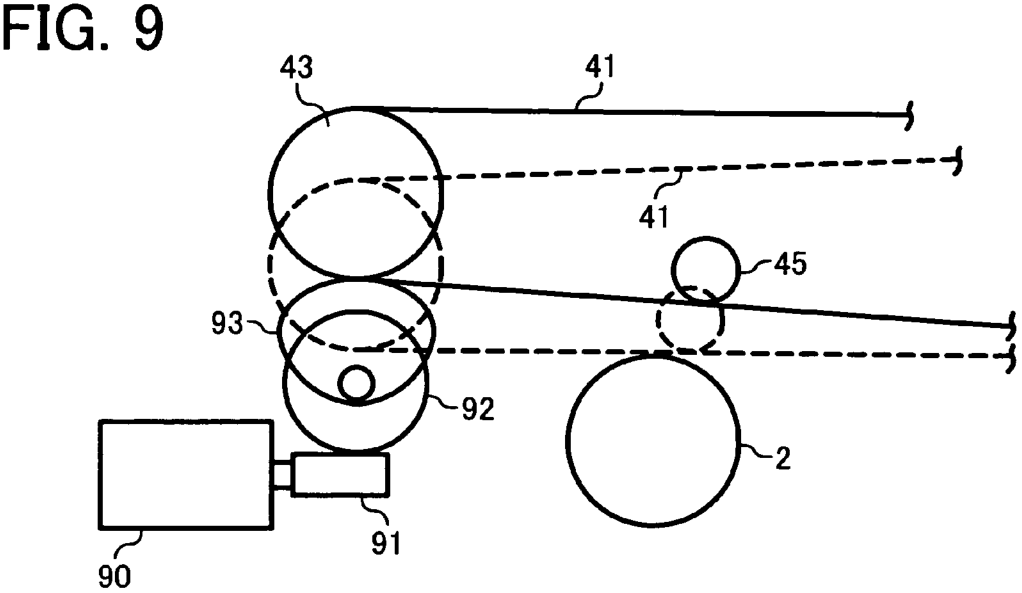
FIG. 9 is a schematic structure (according to an example embodiment of the present invention) of a contact and separation method (according to an example embodiment of the present invention) for the photoconductive element and the intermediate transfer member.

Referring to FIG. 9, a schematic structure of a part of the transfer unit 40 (according to an example embodiment of the present invention) is described.

In FIG. 9, the solid line shows the position of the intermediate transfer belt 41 when separated from the photoconductive element 2, and the dotted line shows the position of the intermediate transfer belt 41 when contacting the photoconductive element 2. It is assumed that the above-described adjustment of the phase difference is performed with the structure of FIG. 9. When the rotation speed of the drum drive motor 20 is changed while the photoconductive element 2 and the intermediate transfer belt 41 are held in contact with each other, both of the photoconductive element 2 and the intermediate transfer belt 41 may be scratched or worn because of the speed difference between the photoconductive element 2 and the intermediate transfer belt 41, thereby the lives of the photoconductive element 2 and the intermediate transfer belt 41 may considerably be degraded.

Therefore, the transfer unit 40 of FIG. 9 includes a contact and separation method using a contact and separation motor 90, a worm gear 91, a worm wheel 92, and a cam 93. The contact and separation method can control the separation and contact of the photoconductive element 2 and the intermediate transfer belt 41. When the contact and separation motor 90 is driven, the torque of the contact and separation motor 90 is transmitted to the worm gear 91 so that the cam 93 mounted on the worm wheel 92 can start rotating. The rotation of the cam 93 pushes up the cleaning backup roller 43 serving as a driven roller in the transferring operation so that the cleaning backup roller 43 can be retracted. Then, the speed of the photoconductive drive motor (not shown) is controlled for the adjustment of the phase difference.

After the speed control of the photoconductive drive motor for the adjustment of the phase difference is completed, the contact and separation motor 90 is rotated to return the cleaning backup roller 43 to its original position. Accordingly, the photoconductive element 2 and the intermediate transfer belt 41 are held in contact with each other again so that the next image forming operation can be performed.

Further, the contact and separation method may be employed by virtue of the long lives of photoconductive elements except a photoconductive element for black toner images. More specifically, an image forming operation for black and white images may be performed more frequently than an image forming operation for color images. When the image forming operation for black and white images is performed with the photoconductive element 2*bk* for black toner images, the photoconductive elements 2*y*, 2*m*, and 2*c* for yellow, magenta, and cyan toner images can be separated from the intermediate transfer belt 41 and retracted to respective reference positions. Thereby, the photoconductive elements 2*y*, 2*m*, and 2*c* for yellow, magenta, and cyan toner images may not be used during the image forming operation for producing black and white images and can be used longer than the photoconductive element 2*bk*. Therefore, the contact and separation method is not applied to the photoconductive element 2*bk* for black toner images. Consequently, the photoconductive element 2*bk* is employed as a reference photoconductive element so that the photoconductive element 2*bk* will keep a stable rotation speed without need for the contact and separation method. While not needed, the contact and separation method can be provided to the photoconductive element 2*bk* for further image forming operations.

According to one or more example embodiments of the present invention, the adjustment of the phase difference can reduce (if not completely prevent) degradation of rotation speed variations of toner images. At the same time, the adjustment may cause a delay time in image forming. To avoid the delay time to occur, the set values of operating time the controlling unit 60 can be changed via an operation panel of the color printer 100 to give priority to the end time of the image forming operation.

Further, the adjustment of the phase difference can be controlled as described below, under the condition in which "Δt" represents a delay time (of a phase in rotations of a photoconductive element to be adjusted with respect to a phase in rotations of the reference photoconductive element) for the adjustment of the phase difference, and "T" represents one rotation period of one of the photoconductive element to be adjusted and the reference photoconductive element.

Figure 10:
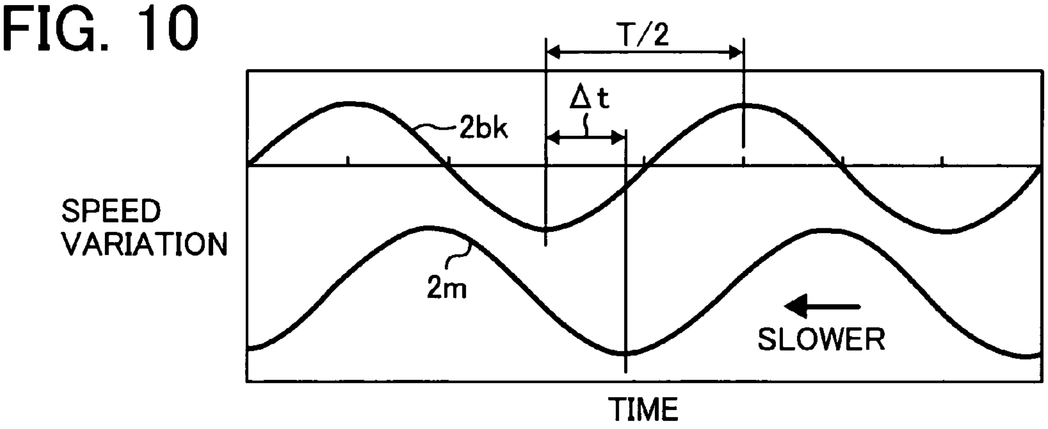
FIG. 10 is a graph showing a phase difference in rotations between the image bearing member for black toner images and the image bearing member for magenta toner images when a relationship of $0<\Delta t\leqq(T/2)$ is satisfied (according to an example embodiment of the present invention)

In a case in which the delay time "Δt" and the one cycle "T" has a relationship of $0<\Delta t \leqq (T/2)$ as shown in FIG. 10 (according to an example embodiment of the present invention), the rotation speed of the drum drive motor 20*m* for the photoconductive element 2*m* that is to be adjusted is set to be faster than the rotation speed used in the regular image forming operation. In this case, the period of time for the adjustment of the phase difference may be reduced compared to the adjustment with the slower rotation speed.

Figure 11:
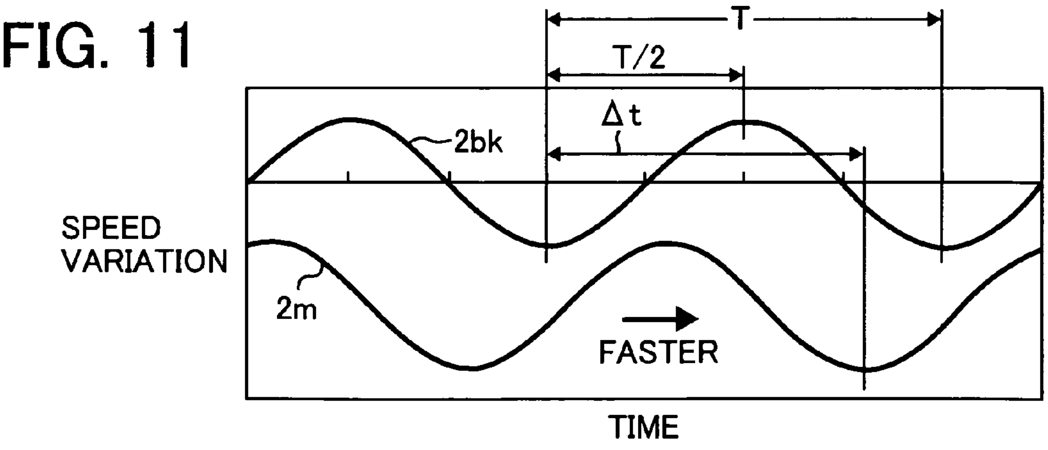
FIG. 11 is a graph showing a phase difference in rotations between the image bearing member for black toner images and the image bearing member for magenta toner images when a relationship of $(T/2)<\Delta t<T$ is satisfied (according to an example embodiment of the present invention)

On the other hand, in a case in which the delay time "Δt" and the one cycle "T" has a relationship of $(T/2)<\Delta t<T$ as shown in FIG. 11 (according to an example embodiment of the present invention), the rotation speed of the drum drive motor 20*m* for the photoconductive element 2*m* to be adjusted is set to be slower than the rotation speed used in the regular image forming operation. In this case, the period of time for the adjustment of the phase difference may be reduced compared to the adjustment with the slower rotation speed.

Accordingly, by switching the rotation speed of the photoconductive element to be adjusted according to the relationship of the delay time "Δt" and the one cycle "T", the delay time in the process of the image forming operation due to the adjustment of the phase different can be reduced (if not minimized).

Figure 12:
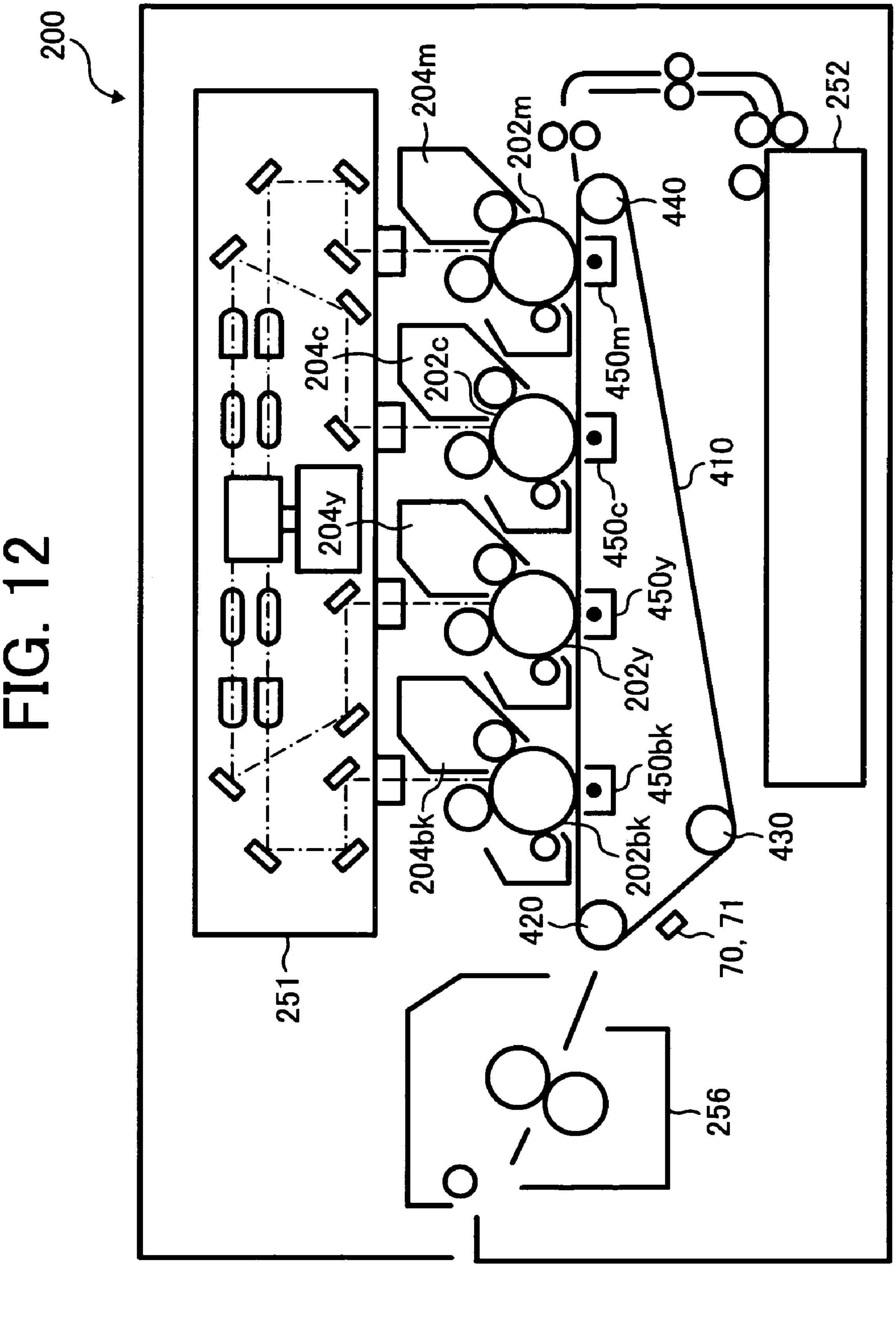
FIG. 12 is a schematic structure of a color printer according to an example embodiment of the present invention.

Referring to FIG. 12, a schematic structure of another color printer 200 using a direct transfer method is described according to an example embodiment of the present invention, as an alternative to the color printer 100 using an indirect transfer method. Since the color printer 200 of FIG. 12 employs the direct transfer method, toner images formed on photoconductive elements 202*y*, 202*m*, 202*c*, and 202*bk* are overlaid directly onto a transfer sheet conveyed by a sheet transfer belt 410. Various features of the above-described example embodiments of the present invention can be incorporated into the color printer 200, thus resulting in additional example embodiments of the present invention. The color printer 200 includes the photoconductive elements 202*y*, 202*m*, 202*c*, and 202*bk*, developing units 204*y*, 204*m*, 204*c*, and 204*bk*, an optical writing unit 251, a sheet feeding cassette 252, and a fixing unit 256. In the color printer 200, the optical writing unit 251 writes respective electrostatic latent images on the photoconductive elements 202*y*, 202*m*, 202*c*, and 202*bk*, which are developed by the developing units 204*y*, 204*m*, 204*c*, and 204*bk*, respectively, to toner images. A transfer sheet fed from the sheet feeding cassette 252 is conveyed by the sheet transfer belt 410 that forms an endless belt, extended by support rollers 420, 430, and 440. When passing respective primary transfer portions on the sheet transfer belt 410 opposite to the photoconductive elements 2*y*, 2*m*, 2*c*, and 2*bk*, the respective toner images formed on the photoconductive elements 2*y*, 2*m*, 2*c*, and 2*bk* are directly overlaid in a sequential manner onto a transfer sheet conveyed by the sheet transfer belt 410 as an overlaid toner image. The fixing unit 56 fixes the overlaid toner image. A transfer unit that transfers the image from the photoconductive element to the transfer sheet includes transfer chargers 450*y*, 450*m*, 450*c*, and 450*bk*. The transfer chargers 450*y*, 450*m*, 450*c*, and 450*bk* are disposed opposite to the photoconductive elements 2*y*, 2*m*, 2*c*, and 2*bk*, respectively, sandwiching the sheet transfer belt 410. The reference pattern toner image used for controlling the adjustment of the color shift is formed at ends in the width direction of the front surface of the sheet transfer belt 410 and is read by the sensors 70 and 71.

The above-described example embodiments are illustrative, and numerous additional modifications and variations are possible in light of the above teachings. For example, elements and/or features of different example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

What is claimed:

1. An image forming apparatus, comprising:

a plurality of image bearing members configured to bear respective images;

an optical writing unit configured to write the respective images on the plurality of image bearing members by deflecting a laser beam off a polygon mirror;

a transfer unit configured to transfer the respective images onto an image receiving member;

a controlling unit configured to perform an adjustment of a difference in phase of respective rotation speeds between the plurality of image bearing members at a timing of one of non-image forming operations during a series of image forming operations performed by the plurality of image bearing members, the optical writing unit, and the transfer unit;

a rotation position detecting unit configured to detect respective rotation positions of the plurality of image bearing members; and a phase difference adjusting unit configured to calculate an amount of the phase difference based on a detection result obtained by the rotation position detecting unit and adjust the phase difference according to a result obtained by the calculation.

2. The image forming apparatus according to claim 1, wherein the respective images written by the optical writing unit include respective reference pattern toner images for the plurality of image bearing members.

3. The image forming apparatus according to claim 1, wherein the image receiving member comprises:

an intermediate transfer member configured to directly receive the respective images thereon; and a sheet transferring member configured to convey a recording medium to indirectly receive the respective images through the intermediary of the recording medium.

4. The image forming apparatus according to claim 1, further comprising:

a plurality of driving sources configured to separately drive the plurality of image bearing members corresponding thereto;

an image reading unit configured to read the respective images formed on the image receiving member of the transfer unit; and an image shift adjusting unit configured to calculate an amount of shift in the respective images on the image receiving member based on a reading result obtained by the image reading unit and adjust respective rotation speeds of the plurality of image bearing members so that an amount of an image shift smaller than an amount of a pitch in a sub-scanning direction of consecutive main scanning lines of the laser beam is reduced.

5. The image forming apparatus according to claim 4, wherein the controlling unit determines the timing of the one of non-image forming operations to adjust the phase difference according to the amount of shift in the respective images on the image receiving member based on the reading result obtained by the image reading unit.

6. The image forming apparatus according to claim 4, wherein the controlling unit determines a target adjusted value of the phase difference for each of the plurality of image bearing members according to an amount of displacement of the image formed on each of the plurality of image bearing members.

7. The image forming apparatus according to claim 4, wherein the controlling unit determines a target adjusted value of the phase difference for each of the plurality of image bearing members according to an output of an encoder mounted on each of the plurality of image bearing member at a central axis of rotation thereof.

8. The image forming apparatus according to claim 4, wherein the plurality of image bearing members and the image receiving member are configured to contact with and separate from each other.

9. The image forming apparatus according to claim 8, wherein the image receiving member is separated from the plurality of image bearing members before the adjustment of the phase difference is performed and is contacted with the plurality of image bearing members after the adjustment of the phase difference is completed.

10. The image forming apparatus according to claim 4, wherein the plurality of image bearing members include a reference image bearing member for black toner images configured to perform as a reference image bearing member for the adjustment of the phase difference and image bearing members for color toner images different from black toner images configured to perform as a target image bearing member having a phase difference to be adjusted.

11. The image forming apparatus according to claim 4, wherein:

a rotation speed of one of the plurality of driving source corresponding to a target image bearing member having a phase difference to be adjusted is set to be faster than a rotation speed used in a regular image forming operation when a relationship of $0<\Delta t \leqq (T/2)$ is satisfied; and the rotation speed of one of the plurality of driving source corresponding to the target image bearing member having a phase difference to be adjusted is set to be slower than the rotation speed used in the regular image forming operation when a relationship of $(T/2)<\Delta t<T$ is satisfied, where "Δt" represents a delay time of a phase in rotations of the target image bearing member with respect to a phase in rotations of the reference image bearing member, and "T" represents one rotation period of one of the reference and target image bearing members.

12. An image forming apparatus, comprising:

bearing means for bearing images;

writing means for writing the images on the bearing means by deflecting a laser beam off a polygon mirror;

transferring means for transferring the images onto receiving means the images;

controlling means for controlling an adjustment of a difference in phase of respective rotation speeds between the bearing means at a timing of one of non-image forming operations during a series of image forming operations performed by the bearing means, the writing means, and the transferring means;

detecting means for detecting rotation positions of the bearing means; and second means for adjusting the phase difference according to a result obtained by calculating an amount of the phase difference based on a detection result obtained by the detecting means.

13. The image forming apparatus according to claim 12, wherein the images written by the writing means include reference pattern toner images for the bearing means.

14. The image forming apparatus according to claim 12, wherein the receiving means comprises:

means for directly holding the image thereon; and means for conveying a recording medium to indirectly hold the images through the intermediary of the recording medium.

15. The image forming apparatus according to claim 12, further comprising:

driving means for driving the bearing means corresponding thereto separately;

reading means for reading the images formed on the receiving means;

first means for adjusting rotation speeds of the bearing means by calculating an amount of shift in the images on the receiving means based on a reading result obtained by the reading means so that an amount of an image shift smaller than an amount of a pitch in a sub-scanning direction of consecutive main scanning lines of the laser beam is reduced.

16. The image forming apparatus according to claim 15, wherein the controlling means determines the timing of the one of non-image forming operations to adjust the phase difference according to the amount of shift in the respective images on the receiving means based on the reading result obtained by the reading means.

17. The image forming apparatus according to claim 15, wherein the controlling means determines a target adjusted value of the phase difference for the bearing means according to an amount of displacement of the image formed on the bearing means.

18. The image forming apparatus according to claim 15, wherein the controlling means determines a target adjusted value of the phase difference for the bearing means according to an output of an encoder mounted on the bearing means at a central axis of rotation thereof.

19. The image forming apparatus according to claim 15, wherein the bearing means and the receiving means are configured to contact with and separate from each other.

20. The image forming apparatus according to claim 19, wherein the receiving means is separated from the bearing means before the adjustment of the phase difference is performed and is contacted with the bearing means after the adjustment of the phase difference is completed.

21. The image forming apparatus according to claim 15, wherein the bearing means includes BT means black toner images representing a reference for the adjustment of the phase difference and CT means for bearing color toner images different from the black toner images, the CT means representing a target having a phase difference to be adjusted.

22. The image forming apparatus according to claim 15, wherein:

a rotation speed of the driving means is set to be faster than a rotation speed used in a regular image forming operation when a relationship of $0<\Delta t \leqq (T/2)$ is satisfied; and the rotation speed of the driving means is set to be slower than the rotation speed used in the regular image forming operation when a relationship of $(T/2)<\Delta t<T$ is satisfied, where "Δt" represents a delay time of a phase in rotations of the bearing means with respect to a phase in rotations of the BT means, and "T" represents one rotation period of one of the BT means and the CT means.

23. A method of adjusting an image shift, comprising the steps of:

forming respective images on a plurality of image bearing members by deflecting a laser beam off a polygon mirror in an optical writing unit;

transferring the respective images onto an image receiving member of a transferring unit;

reading the respective images formed on the image receiving member;

calculating an amount of shift in the respective images based on a result of the reading step;

adjusting respective rotation speeds of the plurality of image bearing members so that an amount of an image shift smaller than an amount of a pitch in a sub-scanning direction of consecutive main scanning lines of the laser beam is reduced;

detecting respective rotation positions of the plurality of image bearing members;

calculating an amount of a difference in phase of respective rotation speeds between the plurality of image bearing members based on a result of the detecting step;

adjusting the phase difference according to the calculation result; and controlling an adjustment of the phase difference at a timing of one of non-image forming operations during a series of image forming operations.

24. The method according to claim 23, further comprising the step of:

driving the plurality of image bearing members separately.

25. The method according to claim 23, wherein the controlling step determines the timing of the one of non-image forming operations to adjust the phase difference according to the amount of shift in the respective images on the image receiving member based on the result of the reading step.

26. The method according to claim 23, wherein the controlling step determines a target adjusted value of the phase difference for each of the plurality of image bearing members according to an amount of displacement of the image formed on each of the plurality of image bearing members.

27. The method according to claim 23, wherein the controlling step determines a target adjusted value of the phase difference for each of the plurality of image bearing members according to an output of an encoder mounted on each of the plurality of image bearing member at a central axis of rotation thereof.

28. The method according to claim 23, further comprising the steps of:

separating the image receiving member from the plurality of image bearing members; and contacting the image receiving member with the plurality of image bearing members, wherein the separating step and the contacting step are performed between the controlling step.

29. The method according to claim 23, wherein:

the controlling step causes a driving source corresponding to a target image bearing member having a phase difference to be adjusted to rotate faster than a rotation speed used in a regular image forming operation when a relationship of $0<\Delta t \leqq (T/2)$ is satisfied; and the controlling step caused a driving source corresponding to the target image bearing member having a phase difference to be adjusted to rotate slower than the rotation speed used in the regular image forming operation when a relationship of $(T/2)<\Delta t<T$ is satisfied, where "$\Delta t$" represents a delay time of a phase in rotations of the target image bearing member with respect to a phase in rotations of the reference image bearing member, and "T" represents one rotation period of one of the reference and target image bearing members.

* * * * *